Figure 1:
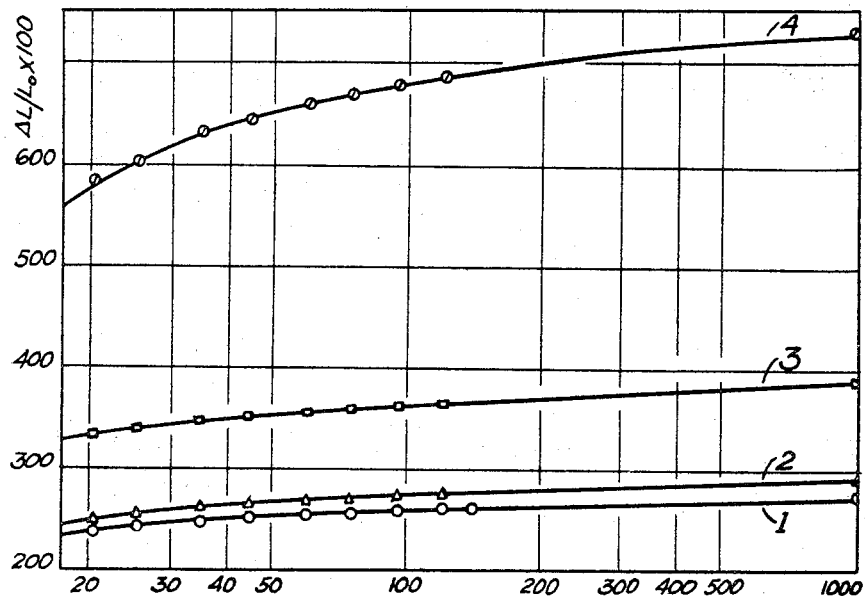

July 13, 1965 G. NATTA ETAL 3,194,849
PROCESS FOR PRODUCING CREEP RESISTANT CROSS-LINKED PRODUCTS FROM
POLYPROPYLENE AND POLYBUTENE-1, AND THE CROSS-LINKED
PRODUCTS SO PRODUCED
Filed July 29, 1958 2 Sheets-Sheet 1

INVENTORS
GIULIO NATTA
GIOVANNI CRESPI
MARIO BRUZZONE

BY Toulmin & Toulmin

ATTORNEYS

INVENTORS
GIULIO NATTA
GIOVANNI CRESPI
MARIO BRUZZONE
BY Toulmin & Toulmin
ATTORNEYS United States Patent Office 3,194,849
Patented July 13, 1965

3,194,849
PROCESS FOR PRODUCING CREEP RESISTANT CROSS-LINKED PRODUCTS FROM POLYPROPYLENE AND POLYBUTENE-1, AND THE CROSS-LINKED PRODUCTS SO PRODUCED
Giulio Natta, Giovanni Crespi, and Mario Bruzzone, Milan, Italy, assignors to Montecatini Società Generale per l'Industria Mineraria e Chimica, Milan, Italy
Filed July 29, 1958, Ser. No. 751,741
Claims priority, application Italy, Aug. 1, 1957, 11,560/57
22 Claims. (Cl. 260—878)

This invention relates to cross-linked crystalline homopolymers of alpha-olefins of the formula $CH_2=CHR$ where R is a hydrocarbon radical containing from 1 to 16 carbon atoms.

It is the primary object of this invention to provide modified, cross-linked crystalline homopolymers of the alpha-olefins which exhibit a high elastic resistance to strains even at temperatures above the melting point of the crystallites, the melting point or 1st order transition temperature being the temperature at which the crystallinity observable at the X-rays disappears completely.

Another object is to cross-link the crystalline homopolymers without subjecting the polymers to irradiation with high energy electrons or with radiations produced by an atomic pile.

Recently G. Natta and his co-workers have disclosed new homopolymers of the alpha-olefins consisting prevailingly to substantially of isotactic macromolecules, i.e. macromolecules having the regular steric structure which Natta has termed "isotactic" and which polymers are crystallizable.

The isotactic structure of a macromolecule of an alpha-olefin homopolymer is characterized in that substantially all of the tertiary asymmetric main chain carbon atoms of the adjacent monomeric units making up a given section of the chain have the same steric configuration and when the macromolecule is arbitrarily assumed to be fully extended in a plane, substantially all of the R substituents on the tertiary carbon atoms of said adjacent monomeric units are on one side (e.g. above) and the H atoms are on the other side (e.g. below) of the plane of the main chain. In a successive isotactic portion of the same chain the position of the R and H substituents may be reversed with respect to the positions occupied thereby in the preceding portion.

Isotactic macromolecules are linear, regular head-to-tail macromolecules having substantially no branches longer than R, and substantially the isotactic structure.

Isotactic polymers are polymers consisting of isotactic macromolecules as defined.

As Natta et al. have shown, isotactic polymers are produced when the alpha-olefin is polymerized with the aid of catalysts prepared from halides of heavy metals of Groups IV to VI of the Mendeleef Periodic Table and metal organic compounds of metals of Groups II to III of said Periodic Table. Natta et al. have also shown that the composition of the crude polymerizate obtained depends on the specific catalyst used. Thus, they have shown that if the catalyst is obtained by reducing a high valency halide of the heavy metal, such as $TiCl_4$, with an organometallic compound like triethyl aluminum, the crude polymerizate comprises a mixture of isotactic polymers with linear regular head-to-tail "atactic" (amorphous, non-crystallizable) polymers and with polymers made up of macromolecules containing isotactic portions, and that the sterically different polymers can be separated by selective solvents on the basis of their differences in steric structure.

On the other hand, as Natta et al. have also shown, if the catalyst is prepared directly from a low valency crystalline halide of the heavy metal, such as crystalline violet $TiCl_3$ and triethyl aluminum, and there is no reduction of the halide, the crude polymerizate consists prevailingly to substantially of isotactic polymer.

It is now known from the disclosures of Natta et al. that, while the isotactic structure exists independently of the physical state of the polymeric alpha-olefin, those isotactic polymers are crystalline under normal conditions and are very suitable for making shaped articles of various kinds by die-casting, injection and extrusion molding, and spinning processes.

Isotactic polypropylene and the crystalline polymers of certain branched alpha-olefins have higher melting points than polyethylene and can be used at temperatures higher than polyethylene.

However, while manufactured articles of the isotactic, crystalline polymers have superior mechanical properties which are retained up to temperatures close to the melting points of the crystallites (the melting point or 1st order transition temperature is the temperature at which the crystallinity observable at the X-rays disappears completely), as the temperature increases above the melting point, those polymers tend to behave as viscous liquids and therefore exhibit only a weak resistance to creep. This has the result that the manufactured articles lose their shape and become useless.

Polyethylene obtained by the known high-pressure polymerization methods in the presence of initiators which act with a free radical mechanism has a melting point of 110–115° C. Above that temperature, the polyethylene does not offer any resistance to deformation. Articles made of the polyethylene can be used satisfactorily only at temperatures below 100° C., which is a marked limitation on them. However, if the polyethylene articles obtained by the usual shaping methods for plastics are subjected to irradiation with high energy electrons or to radiations produced for instance by an atomic pile, they can retain an ultimate tensile strength of about 7 kg./cm.$^2$ up to a temperature of 150° C., and thus retain their shape unaltered up to that temperature. (E. Lawton, J. Balwit, etc., Ind. Eng. Chem. 46, 1703, 1954.)

Modification by such irradiation is not suitable in the case of all polymers. In fact, when some polymers (for instance polyisobutene) are subjected to irradiation they undergo a marked degradation and, therefore, even if the end product is completely cross-linked, it may have poor mechanical properties because of the reduced length of the polymer chain. In some cases, the cross-linked products are brittle at room temperature. Moreover, the apparatus required for the irradiation is expensive, particularly for articles of large size, and therefore even when the irradiation is not destructive it is only practical in particular cases or for large-scale production.

In addition, the cross-linking by irradiation as described is only entirely effective when the shaped articles to be treated are comparatively thin, since the radiations penetrate into the polymers only to a limited extent.

We find that the isotactic, crystalline homopolymers of the alpha-olefin, especially those containing tertiary carbon atoms, can be cross-linked without resort to the irradiation and yield articles which have good mechanical properties even at temperatures remarkably higher than the temperature of complete melting of the crystals.

The cross-linking is effected, in accordance with one embodiment of this invention, by mixing the crystalline polymer with a monomer capable of polymerizing with a radical mechanism, in the presence of a small amount of a substance capable of supplying free radicals such as peroxides or hydroperoxides, and the mixture is heated to effect a substantially complete cross-linking of the polymer. The peroxide or hydroperoxide groups can be present on the polymer chain as a result of a peroxidizing pre-treatment of the polymer.

Our new cross-linked products have substantially the same physical properties which the starting polymers have at the temperatures of normal use, i.e., density, mechanical characteristics, hardness, flexibility, brittle point, power factor, volume resistivity, dielectric constant, etc. However, the mechanical properties exhibited by the cross-linked products at temperatures above the melting point of the non-crosslinked polymers are remarkably better than those exhibited by the last mentioned polymers.

At temperatures above the melting point of the crystals, the mechanical characteristics of our cross-linked polymers, and particularly the stress-elongation curve, are similar to those of a vulcanized elastomer. In fact, the cross-linked polymers have high elongations at break, rather high tensile strengths, and a permanent set at break of about 3% to 10%. Table I below gives the principal data obtained from stress-elongation curves, determined at 200° C. for a polypropylene consisting substantially of isotactic polymer (melting point 170–175° C.) treated with various percentages of a radical initiator (dicumyl peroxide) and vinyl monomer (divinylbenzene).

TABLE I

*Mechanical characteristics at 200° C. of cross-linked isotactic polypropylene*

| Product No. | DCP [1] on the polymer | DVB [2] percent on the polymer | Ultimate tensile strength, kg./cm.$^2$ | Elongation at break, percent | Modulus at 200% elongation, kg./cm.$^2$ | Set at break, percent |
|---|---|---|---|---|---|---|
| 1 | | | | The polymer is completely molten. | | |
| 2 | 1 | 40 | 28 | 925 | 7 | 6 |
| 3 | 2 | 40 | 15 | 380 | 11 | 3 |

[1] DCP is di-alpha-cumylperoxide.
[2] DVB is a mixture containing 60.5% divinylbenzene, 15.4% ethylvinylbenzene, 24.1% higher alkyl benzenes.

Cross-linking was effected by molding products 1, 2 and 3 at 170° C. for 30 minutes.

At room temperature, the mechanical characteristics of our cross-linked polymers are not very different from those of the starting polymers, as is apparent from Table II which gives the principal characteristics derived from stress-elongation curves determined at 25° C. for products (1) and (2) of Table I.

TABLE II

*Mechanical characteristics at 25° C. of cross-linked isotactic polypropylene*

| Product | Yield point, kg./cm.$^2$ | Tensile strength, kg./cm.$^2$ | Elongation at break, percent |
|---|---|---|---|
| 1 | 260 | 420 | 700 |
| 2 | 250 | 380 | 500 |

At temperatures above the melting point of the polymer crystallites, the ultimate tensile strength of the cross-linked polymers hardly decreases with an increase in the temperature. If the polymer is adequately protected against oxidation by incorporating a suitable antioxidant therein, its mechanical characteristics are kept within certain limits, even at temperatures of the order of 250° C. Thus, at 250° C., product (2) of Table I has an ultimate tensile strength higher than 15 kg./cm.$^2$, an elongation at break of 730%, and a set at break of 4%.

Both the non-oriented cross-linked polymers and the polymers stretched after the cross-linking exhibit improved characteristics at temperatures below the melting point even when the strain is determined under a constant load.

In fact, for the same duration of stress, the deformation of the cross-linked polymers is less, and the deformation rate is considerably lower, than for the starting polymers.

FIGURE 1 of the attached drawing shows the creep curves determined at 160° C. (time in minutes being reported on the abscissae) with a constant load of 15 kg./cm.$^2$ on non-oriented cross-linked polymers according to the invention and having different degrees of cross-linking. The specimens from which the curves of FIGURE 1 were plotted were obtained by molding, at 170° C. for 30 minutes, mixtures having compositions as shown in Table III.

TABLE III

*Composition of mixes for cross-linked polypropylene*

| Product | Isotactic polypropylene, parts by weight | DVB, parts by weight | DCP, parts by weight | Antioxidant (x),[1] parts by weight |
|---|---|---|---|---|
| 4 | 100 | 40 | 2 | 1 |
| 5 | 100 | 40 | 1 | 1 |
| 6 | 100 | 20 | 1 | 1 |
| 7 | 100 | | | 1 |

[1] (x) = 2,2-methylen bis-(4-methyl 6-tert. butylphenol).

Figure 2:
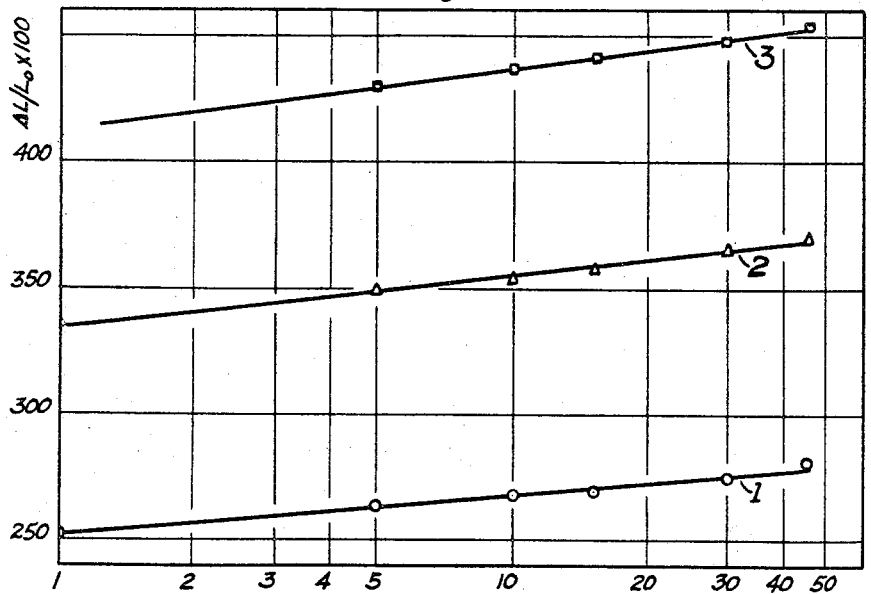

FIGURE 2 of the attached drawing shows similar curves determined at 190° C. under a constant load of 7.5 kg./cm.$^2$ on specimens prepared from compositions (1), (2) and (3) of Table I.

As expected, product 7 melts after a fed seconds and flows rapidly even under its own weight. The total strain and the slope of the creep curves reported in the semi-logarithmical diagram decrease from product 6 to product 4, that is, with increasing cross-linking.

When the cross-linked products are oriented by stretching, either before or after the cross-linking treatment, they show valuable mechanical properties, such as high tensile strength coupled with improved resistance to creep, both at elevated and at normal temperatures. Such properties render the products very useful when oriented films or yarns having a high creep resistance and unaltered high tenacity are required.

Figure 3:
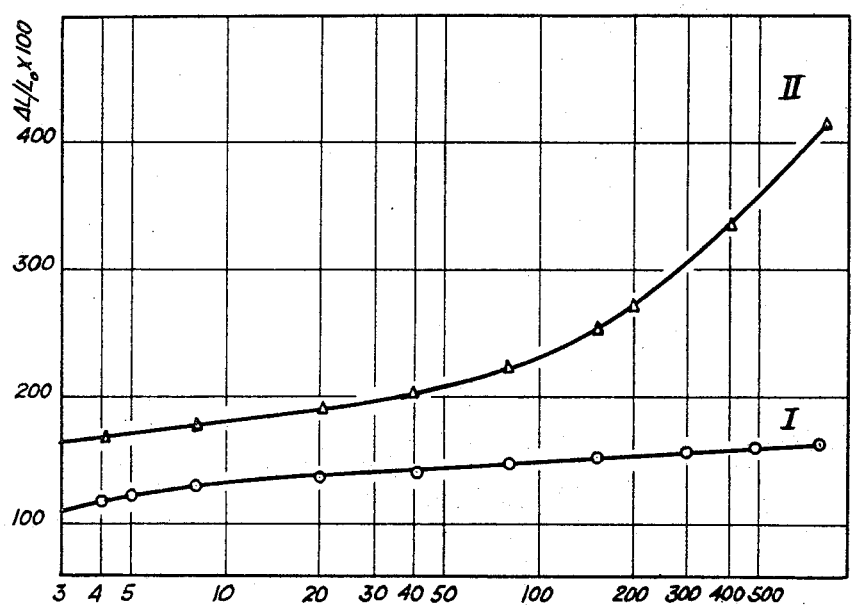

FIGURE 3 of the attached drawing shows the creep curve (I) for a cross-linked and pre-stretched polypropylene in comparison with the screep curve (II) for a non-crosslinked, pre-stretched polypropylene. Both curves were determined at 150° C. under a constant load of 300 kg./cm.$^2$ calculated on the cross-sectional area after stretching.

The cross-linked polymers have a remarkably improved resistance to solvents, and in the highly cross-linked polymers the swelling is contained within rather moderate limits. The results obtained by swelling tests on the cross-linked polymers and carried out in tetrahydronaphthalene at 150° C. for 90 minutes are given in Table IV.

TABLE IV

*Swelling index of cross-linked polypropylene*

| Product:[1] | Swelling index[2] |
|---|---|
| 4 | 2.99. |
| 5 | 3.10. |
| 6 | 4.70. |
| 7 | Completely dissolved at 150° C. |

[1] With reference to Table III.
[2] Determined according to Flory; Principles of Polymer Chemistry, Cornell University Press 1953, page 579.

Monomers which are polymerizable with a radical mechanism and which can be used in the present process include styrene, divinylbenzene, butadiene and its homologs, acrylates, methacrylates, vinyl chloride, etc. When the monomer used does not contain highly polar groups (such as a hydrocarbon monomer) the electric characteristics of the cross-linked polymers remain very good and, therefore, when such characteristics are desired a monomer of that type is selected for use in the cross-linking process. The polymerizable monomer is used in an amount of from 5% to 50% by weight. Mixtures of the monomers can be used.

Radical initiators useful in the present process include various peroxides, hydroperoxides and organic peresters, such as, for example, benzoyl peroxide, tert. butyl perbenzoate, dicumyl peroxide, di-tert. butylperoxide, etc. The radical initiator selected is one which does not exert any considerable oxidizing action and which decomposes with a radical mechanism at temperatures which are suitable for shaping the cross-linked polymers.

To obtain the cross-linked polymers, the starting polymer can be mixed with the radical initiator and the monomer, and the mixture then brought to suitable molding temperature. That is to say the cross-linking can be effected simultaneously with shaping of the polymer. The duration of the shaping process is selected so that, depending on the radical initiator and monomer used, a cross-linking as complete as possible is obtained. The radical initiator is used in an amount of from 1% to 10% by weight.

If the polymer has been given a peroxidizing pre-treatment and the polymer chain contains a sufficient amount of peroxide or hydroperoxide groups capable of decomposing with a radical mechanism, the cross-linking can be achieved by simply mixing the peroxidized polymer with the polymerizable monomer, and shaping the mixture.

The shaping temperature at which the cross-linking is also accomplished can vary but is generally between 120° C. and 200° C.

The following examples are given to illustrate the invention and are not intended as limiting.

EXAMPLE 1

100 parts by weight of a propylene polymerizate consisting substantially of isotactic polymer and having an intrinsic viscosity of $4.56 \times 10^2$ cc./g. (determined in tetrahydronaphthalene at 135° C.) are mixed with 40 parts of a mixture of 60.5% divinylbenzene
15.4% ethylvinylbenzene
24.1% higher alkyl benzenes, and with
2 parts by weight of di-alpha-cumyl peroxide The resulting mass is molded in a vertical parallel plate press at a temperature of 170° C. for 30 minutes.

From the sheet thus obtained, D-type specimens are cut by means of a hollow punch for tensile tests according to ASTM D 142–51T. The tensile tests are carried out with a rate of separation of the grips of 25 mm./minute.

The mechanical tests carried out at 200° C. on the cross-linked polymer give the following results—

| | | |
|---|---|---|
| Tensile strength | kg./cm.² | 15 |
| Elongation at break | percent | 380 |
| Modulus at 300% elongation | kg./cm.² | 11 |
| Set at break | percent | 3 |

Some specimens are left to swell in tetrahydronaphthalene at 150° C. for 90 minutes. The volumetric swelling ratio is 2.99 (see Flory, Principles of Polymers Chemistry, Cornell University Press, 1953, p. 579).

Figure 4:
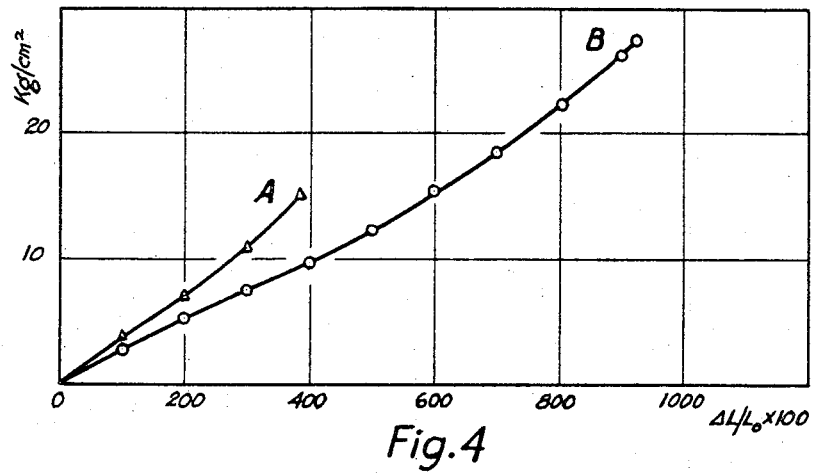

The stress elongation curves for the cross-linked polymer of this example is shown in FIGURE 4 of the drawing (curve A).

EXAMPLE 2

100 parts by weight of the polypropylene of Example 1 are mixed with 40 parts of a mixture containing 60.5% divinylbenzene
15.4% ethylvinylbenzene
24.1% higher alkyl benzenes, and with
1.0 part by weight of alpha-cumyl peroxide The mass is molded at 170° C. for 30 minutes. The tensile tests carried out as in Example 1 give the following results—

At 200° C.:

| | | |
|---|---|---|
| Ultimate tensile strength | kg./cm.² | 28 |
| Elongation at break | percent | 925 |
| Modulus at 300% elongation | kg./cm.² | 7 |
| Set at break | percent | 6 |

At room temperature:

| | | |
|---|---|---|
| Yield strength | kg./cm.² | 250 |
| Ultimate tensile strength | kg./cm.² | 380 |
| Elongation at break | percent | 500 |

Specimens swollen in tetrahydronaphthalene at 150° C. for 90 minutes show a volumetric swelling ratio of 3.10.

FIGURE 4 (curve B) shows the stress-elongation curve for this cross-linked polymer.

EXAMPLE 3

100 parts by weight of the same polypropylene are mixed with 20 parts of a mixture containing.

60.6% divinylbenzene
15.4% ethylvinylbenzene
24.1% higher alkyl benzenes, and with
1.0 part by weight of di-alpha-cumyl peroxide The mixture is molded at 170° C. for 30 minutes. Some specimens were swollen in tetrahydronaphthalene at 150° C. for 90 minutes. The volumetric swelling ratio is 4.70.

EXAMPLE 4

100 parts by weight of a butene-1 polymerizate consisting substantially of isotactic polymer and having an intrinsic viscosity of $3.02 \times 10^2$ cc./g. in tetrahydronaphthalene at 135° C. are mixed with 40 parts of a mixture containing 60.5% divinylbenzene
15.4% ethylvinylbenzene
24.1 higher alkyl benzenes, and with
1.0 part by weight of di-alpha cumyl peroxide and the mass is molded at 170° C. for 30 minutes.

A specimen as obtained as described in Example 1 is subjected to a constant load of 5 kg./cm.² at a temperature of 120° C. This specimen elongates 260% within one minute, 25% within the succeeding 90 minutes, and 15% within the following 3900 minutes, all elongations being referred to the initial length.

In contrast, when a specimen obtained by molding the same untreated polybutene-1 is subjected to the same load at 120° C., it breaks within a few seconds.

The polymers which are cross-linked according to the present method preferably have a high molecular weight, i.e. a molecular weight of at least 80.000.

Various changes may be made in details in practicing the invention without departing from the spirit thereof. Therefore, we intend to include in the scope of the appended claims all such modifications as may be apparent to those skilled in the art.

What is claimed is:

1. A process for increasing the creep resistance of linear crystalline homopolymers made up of isotactic macromolecules and selected from the group consisting of polypropylene and polybutene-1, which process consists essentially of the steps of mixing the linear homopolymer with from 1% to 10% by weight of dicumyl peroxide and with from 5% to 50% by weight of a monomeric material selected from the group consisting of styrene and divinyl benzene, and heating the mixture at a temperature of about 170° C., to produce a polypropylene and polybutene-1 respectively, having cross-links made up of units derived from the monomeric material between the chains thereof, the cross-linked homopolymer being resistant to solvents and to creeping at temperatures above the melting point of the crystalline isolatic homopolymer, and being further characterized in that it has susbtantially the same density, mechanical properties, hardness, flexibility, brittle point, power factor, volume resistivity, and dielectric constant as the starting linear homopolymer at the temperatures of normal use, and a stress-elongation curve which is similar to that of vulcanized rubber.

2. The process according to claim 1, characterized in that the linear homopolymer is polypropylene.

3. The process according to claim 1, characterized in that the linear homopolymer is polybutene-1.

4. The process according to claim 1, characterized in that the linear homopolymer is polypropylene and the monomeric material is styrene.

5. The process according to claim 1, characterized in that the linear homopolymer is polypropylene and the monomeric material is divinyl benzene.

6. The process according to claim 1, characterized in that the linear homopolymer is polybutene-1 and the monomeric material is styrene.

7. The process according to claim 1, characterized in that the linear homopolymer is polybutene-1 and the monomeric material is divinyl benzene.

8. A cross-linked homopolymer produced according to claim 1.

9. A cross-linked polypropylene produced according to claim 2.

10. A cross-linked polybutene-1 produced according to claim 3.

11. A process for producing shaped, creep resistant manufactured articles which process comprises mixing a linear crystalline homopolymer made up of isotactic macromolecules and selected from the group consisting of polypropylene and polybutene-1 with from 1% to 10% by weight of di-cumyl peroxide and with from 5% to 50% by weight of a monomeric material selected from the group consisting of styrene and divinyl benzene, and heating the mixture at a temperature of about 170° C. while simultaneously shaping the same, whereby cross-links made up of units derived from the monomeric material are formed between chains of the isotactic homopolymer during the shaping step.

12. The process according to claim 11, characterized in that the linear homopolymer is polypropylene.

13. The process according to claim 11, characterized in that the linear homopolymer is polybutene-1.

14. The process according to claim 11, characterized in that the linear homopolymer is polypropylene, and the monomeric material is styrene.

15. The process according to claim 11, characterized in that the linear homopolymer is polypropylene, and the monomeric material is divinyl benzene.

16. The process according to claim 11, characterized in that the linear homopolymer is polybutene-1, and the monomeric material is styrene.

17. The process according to claim 11, characterized in that the linear homopolymer is polybutene-1, and the monomeric material is divinyl benzene.

18. Shaped manufactured articles produced by the method of claim 11.

19. Shaped manufactured articles produced by the method of claim 12.

20. Shaped manufactured articles produced by the method of claim 13.

21. The process which comprises mixing isotactic polypropylene with a polymerizable monomer in contact with dicumyl peroxide, said polymerizable monomer consisting of divinyl benzene, the polymerizable monomer being present in about 5% by weight based on the polypropylene and the dicumyl peroxide being present in an amount of about 1% by weight based on the polypropylene, and thereafter heating at a temperature and for a sufficient period of time to cause the ingredients of the mixture to react, whereby the properties of the polyproylene are altered.

22. The process which comprises mixing isotactic polypropylene with a polymerizable monomer in contact with dicumyl peroxide, said polymerizable monomer consisting of divinyl benzene, the polymerizable monomer being present in an amount within the range of from about 5% to about 27.5% by weight based on the polypropylene and the dicumyl peroxide being present in an amount within the range of from about 1% to about 10% by weight based on the polypropylene, and thereafter heating at a temperature and for a sufficient period of time to cause the ingredients of the mixture to react, whereby the properties of the polyproylene are altered.

References Cited by the Examiner

UNITED STATES PATENTS

| | | | |
|---|---|---|---|
| 2,155,590 | 4/39 | Garvey | 260—875 |
| 2,282,002 | 5/42 | Scott et al. | 260—879 |
| 2,418,978 | 4/47 | Mertens | 260—853 |
| 2,610,962 | 9/52 | Smyers et al. | 260—886 |
| 2,666,042 | 1/54 | Nozaki | 260—881 |
| 2,728,742 | 12/55 | Banes et al. | 260—886 |
| 2,837,496 | 6/58 | Vandenberg | 260—877 |
| 3,133,889 | 5/64 | Hazenberg et al. | 260—878 |

OTHER REFERENCES

Natta: Journal of Polymer Science, 16, 143–154 (1955).

MURRAY TILLMAN, *Primary Examiner.*

D. ARNOLD, LEON J. BERCOVITZ, *Examiners.*